(12) United States Patent
Kuribayashi

(10) Patent No.: US 12,134,432 B2
(45) Date of Patent: Nov. 5, 2024

(54) STEERING SYSTEM

(71) Applicant: Toyota Jidosha Kabushiki Kaisha, Toyota (JP)

(72) Inventor: Takuya Kuribayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 258 days.

(21) Appl. No.: 17/736,737

(22) Filed: May 4, 2022

(65) Prior Publication Data
US 2022/0379957 A1    Dec. 1, 2022

(30) Foreign Application Priority Data
May 31, 2021   (JP) ................................. 2021-091392

(51) Int. Cl.
    *B62D 6/00*        (2006.01)
    *B62D 5/04*        (2006.01)

(52) U.S. Cl.
    CPC ........... *B62D 6/008* (2013.01); *B62D 5/0481* (2013.01); *B62D 6/003* (2013.01)

(58) Field of Classification Search
CPC ...... B62D 6/008; B62D 5/0481; B62D 6/003; B62D 7/159; B62D 6/007; B62D 6/04; B62D 5/0463; B62D 7/18; B62D 7/20; B60T 1/065; B60T 7/06; B60T 13/66; B60T 17/22
See application file for complete search history.

(56) References Cited

U.S. PATENT DOCUMENTS

2004/0138796 A1    7/2004   Yao et al.
2010/0004825 A1*   1/2010   Nakano ................. B62D 6/008
                                                           701/42
2020/0223478 A1    7/2020   Sano

FOREIGN PATENT DOCUMENTS

| | | |
|---|---|---|
| DE | 10 2009 039 372 A1 | 3/2011 |
| EP | 1 125 826 A2 | 8/2001 |
| JP | 2006-256346 A | 9/2006 |
| JP | 2008-44578 A | 2/2008 |
| JP | 2019-171905 A | 10/2019 |
| JP | 2020-111270 A | 7/2020 |

* cited by examiner

*Primary Examiner* — Jacob M Amick
*Assistant Examiner* — Charles J Brauch
(74) *Attorney, Agent, or Firm* — Sughrue Mion, PLLC

(57) ABSTRACT

A steer-by-wire steering system, including: a pair of wheel steering devices respectively provided for right and left wheels of a vehicle, each of the pair of wheel steering devices including an actuator and configured to steer a corresponding one of the right and left wheels independently of the other of the right and left wheels; and a controller configured to control the pair of wheel steering devices such that steering amounts of the respective right and left wheels are equal to respective amounts based on a steering request, wherein the controller executes a steering-amount stabilizing control to reduce a change in the steering amounts in an external-force-dependent steering situation in which the right and left wheels are steered or likely to be steered by an external force applied to the right and left wheels.

4 Claims, 5 Drawing Sheets

FIG.4

$$M_x = \frac{-\delta_2 \cos\phi_s}{A} F_X \quad ①$$

$$M_y = \frac{\delta_3 \cos\phi_k}{B} F_Y \quad ②$$

$$M_z = \frac{\delta_1 \tan\phi_s - \delta_4 \tan\phi_k}{C} F_Z \quad ③$$

STEERING SYSTEM

CROSS REFERENCE TO RELATED APPLICATION

The present application claims priority to Japanese Patent Application No. 2021-091392, which was filed on May 31, 2021, the disclosure of which is herein incorporated by reference in its entirety.

BACKGROUND

Technical Field

The following disclosure relates to a steering system mounted on a vehicle.

Description of Related Art

A wheel of a vehicle receives a force that acts thereon from an outside such as a road surface. A steering system mounted on the vehicle is required to address the force (hereinafter referred to as "external force" where appropriate). For instance, Patent Document 1 (Japanese Patent Application Publication No. 2019-171905) discloses a steering system in which a steering amount of the wheel to be steered is changed when brakes are applied suddenly, in an attempt to assist a braking force. The steering amount may be considered synonymous with "toe angle".

SUMMARY

In the disclosed steering system, the steering amount of the wheel is positively changed when a relatively large external force acts on the wheel to be steered. (The steering amount may also be considered as "steering angle".) It is, however, necessary to consider that such external input may cause the steering amount of the wheel to be changed regardless of a driver's intention. The influence of the external force is large particularly in a system different from the disclosed steering system, namely, in a system in which right and left wheels are not mechanically coupled and are steered by corresponding right and left actuators independently of each other. (Hereinafter, such a system will be referred to as "right-left independent steering system" where appropriate.) To prevent or reduce a change in the steering amount of the wheel due to the external force leads to a stability of vehicle steering. Accordingly, an aspect of the present disclosure is directed to a steering system excellent in vehicle steering stability.

In one aspect of the present disclosure, a steer-by-wire steering system includes:
- a pair of wheel steering devices respectively provided for right and left wheels of a vehicle, each of the pair of wheel steering devices including an actuator and configured to steer a corresponding one of the right and left wheels independently of the other of the right and left wheels; and
- a controller configured to control the pair of wheel steering devices such that steering amounts of the respective right and left wheels are equal to respective amounts based on a steering request, wherein the controller executes a steering-amount stabilizing control to reduce a change in the steering amounts in an external-force-dependent steering situation in which the right and left wheels are steered or likely to be steered by an external force that acts on the right and left wheels.

In the steering system according to the present disclosure, the steering-amount stabilizing control is executed in the external-force-dependent steering situation, so that a change in the steering amounts of the wheels is prevented or reduced. Thus, the present disclosure provides a steering system excellent in vehicle steering stability.

Various Forms

The external-force-dependent steering situation is a situation in which a braking force or a drive force each having a magnitude not less than a set magnitude is applied or is being applied to the vehicle. As later explained in detail, when the external force acts on the wheel, a moment about the kingpin axis (hereinafter referred to as "steering moment" where appropriate) is generated for the wheel in a case where the wheel is a steerable wheel. The steering moment is considerably large in sudden braking or the like.

The steering moments generated for the right and left wheels arising from the braking force or the drive force are mutually opposite in direction, for instance. In ordinary steering systems in which the right and left wheels are coupled to each other by a coupling member such as a rack bar and are steered together, the steering moments generated for the right and left wheels arising from the braking force or the drive force are cancelled or offset by the coupling member, in other words, those steering moments are balanced. It is thus possible to consider that such steering moments do not adversely influence on steering of the right and left wheels in the ordinary steering systems described above. The present disclosure is significant especially in a case where the present disclosure is applied to the right-left independent steering system.

As later explained in detail, the steering moments described above are generated also when a crosswind or the like is applied to a body of the vehicle or when the vehicle travels on an undulating road surface. Thus, each of those situations may be identified as the external-force-dependent steering situation described above.

During turning of the vehicle, the wheels are being steered and the external force is acting on the wheels as a matter of course. Thus, the external-force-dependent steering situation, in which the steering-amount stabilizing control is executed, is desirably considered as a situation excluding normal turning or the like of the vehicle, namely, as a situation not intended by the driver. In view of the fact that the external force is generated in normal turning of the vehicle, the influence exerted on the vehicle steering stability when the wheels are steered due to the external force is problematic especially when the vehicle is traveling straight. Thus, the steering-amount stabilizing control is desirably executed on condition that the vehicle is traveling straight.

The steering system of the present disclosure is of a steer-by-wire type. The controller controls the right and left wheel steering devices such that steering positions of the respective right and left wheels are equal to respective positions corresponding to the steering request. Here, the steering position may be considered as the same concept as "steering angle with respect to a neutral posture" or "steering amount with respect to a neutral position", for instance. In the thus configured steering system, the steering-amount stabilizing control for preventing or reducing a change in the steering amounts of the respective right and left wheels may be a control of making the steering positions of the respective right and left wheels less likely to be changed from the respective positions of the right and left wheels corresponding to the steering amounts based on the steering request.

Specifically, the controller may execute, as a normal steering control, a control in which the controller determines, based on the steering request, target steering amounts each as a target for the steering amount of a corresponding one of the right and left wheels and determines, according to a PID feedback control technique, steering forces to be generated by the respective actuators of the pair of wheel steering devices, based on steering amount deviations each of which is a deviation of an actual steering amount with respect to the target steering amount determined for a corresponding one of the right and left wheels and may execute, as the steering-amount stabilizing control, a control for increasing a derivative term gain in the PID feedback control technique. The increase in the derivative term gain makes the steering positions of the respective right and left wheels less likely to be changed from the respective positions of the right and left wheels corresponding to the respective steering amounts based on the steering request, namely, corresponding to the respective target steering amounts.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 4 illustrates mathematical expressions each representing a moment applied to a steering knuckle by an external force.

DETAILED DESCRIPTION OF THE EMBODIMENT

Figure 1:
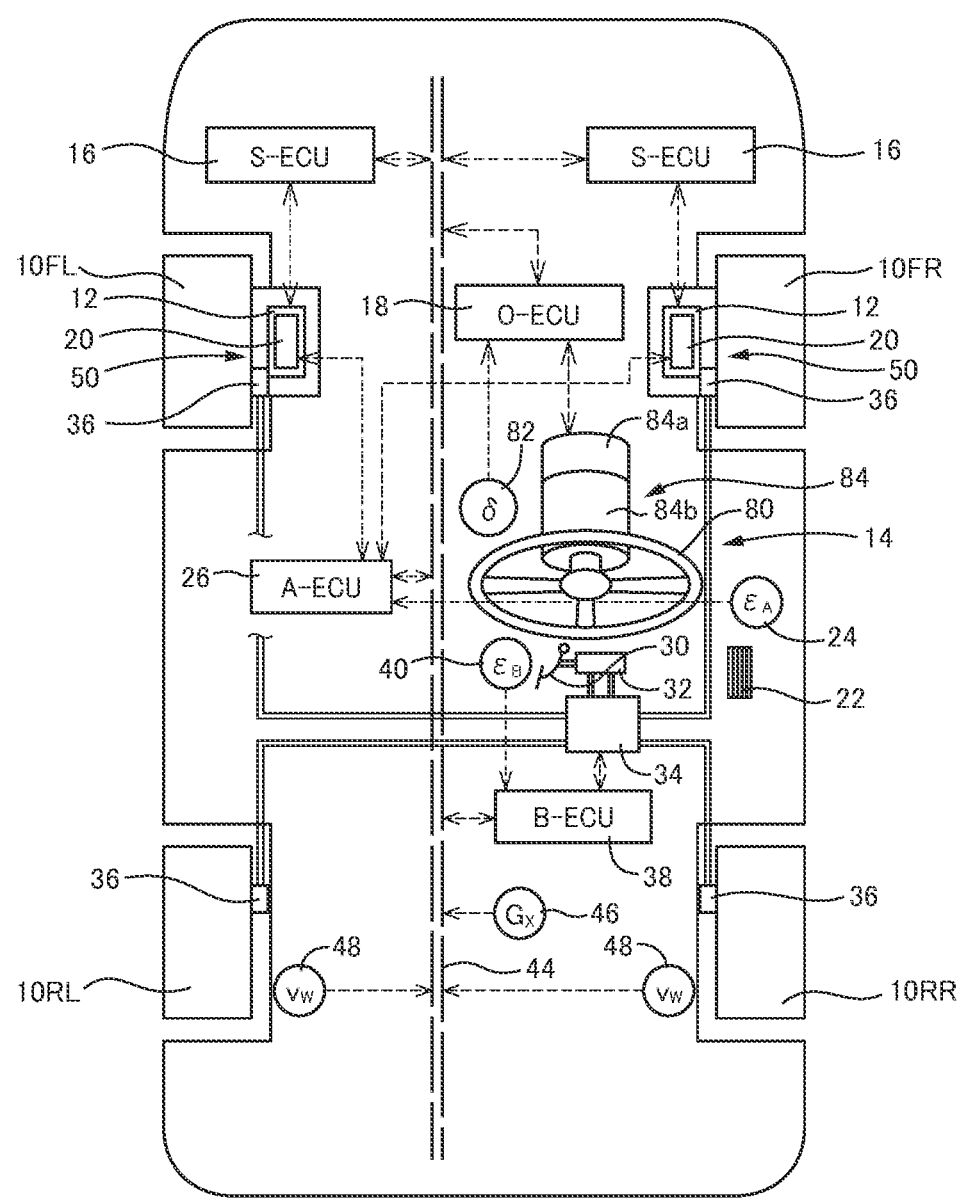
FIG. 1 is a schematic view illustrating an overall configuration of a vehicle on which is mounted a steering system according to one embodiment of the present disclosure.

Referring to the drawings, there will be described in detail a steering system according to an embodiment of the present disclosure. It is to be understood that the present disclosure is not limited to the details of the following embodiment but may be embodied based on the forms described in Various Forms and may be changed and modified based on the knowledge of those skilled in the art.

[A] Overall Configuration of Vehicle on which Steering System is Mounted

As schematically illustrated in FIG. 1, the steering system according to the embodiment of the present disclosure is mounted on a vehicle having front left and right wheels 10FL, 10FR and rear left and right wheels 10RL, 10RR. The front left and right wheels 10FL, 10FR are drive wheels and are steerable wheels. In the following description, when it is not necessary to distinguish the front left and right wheels 10FL, 10FR from each other, each of them will be referred to as the front wheel 10F. When it is not necessary to distinguish the rear left and right wheels 10RL, 10RR from each other, each of them will be referred to as the rear wheel 10R. When it is not necessary to distinguish the front wheels 10F and the rear wheels 10R from each other, each of them will be referred to as the wheel 10.

The steering system is of a steer-by-wire type and is a right-left independent steering system configured to steer the two front wheels 10F independently of each other. The steering system includes: a pair of wheel steering devices 12 respectively provided for the front wheels 10FL; an operation device 14 for receiving an operation by a driver; a pair of steering electronic control units 16 (hereinafter each abbreviated as "steering ECU 16" and denoted as "S-ECU" in FIG. 1) for respectively controlling the pair of wheel steering devices 12; and an operation electronic control unit 18 (hereinafter abbreviated as "operation ECU 18" and denoted as "O-ECU" in FIG. 1) for controlling the operation device 14 and performing overall control of the steering ECUs 16. The configuration and the control of the steering system will be later described in detail. It may be understood that the two steering ECUs 16 and the operation ECU 18 constitute a controller in the present steering system.

A vehicle drive system is mounted on the vehicle. The vehicle drive system includes a pair of wheel drive units 20 each provided for a corresponding one of the two front wheels 10F for drivingly rotating the corresponding front wheel 10F by an electric motor. The vehicle drive system includes: an accelerator pedal 22 (as one example of an accelerator operating member) operated by a driver; an accelerator operation amount sensor 24 for detecting an operation amount of the accelerator pedal 22, i.e., an accelerating operation amount; and a vehicle drive electronic control unit 26 (hereinafter abbreviated as "drive ECU 26" and denoted as "A-ECU" in FIG. 1) for controlling operations of the pair of wheel drive units 20 based on the accelerating operation amount detected by the accelerator operation amount sensor 24. The vehicle drive system has a known configuration and performs ordinary control. Thus, description of the configuration and the control of the vehicle drive system is dispensed with.

The vehicle further includes a hydraulic brake system. The brake system includes: a brake pedal 30 (as one example of a brake operating member) operated by the driver; a master cylinder 32 connected to the brake pedal 30; a working-fluid supply device 34 including a hydraulic pressure source that includes a pump and the like and configured to pressurize a working fluid; four brake devices 36 respectively provided for the four wheels for braking the four wheels by the pressure of the working fluid supplied from the working-fluid supply device 34; and a brake electronic control unit 38 (hereinafter abbreviated as "brake ECU 38" and denoted as "B-ECU" in FIG. 1) for controlling the operation of the working-fluid supply device 34. The brake system is a brake-by-wire brake system. The brake ECU 38 controls the pressure of the working fluid supplied from the working-fluid supply device 34 to the brake device 36 of each wheel 10 based on a brake operation amount, so as to control the braking force applied to the vehicle. The brake operation amount is an operation amount of the brake pedal 30 detected by the brake operation amount sensor 40. The brake system has a known configuration and performs ordinary control. Thus, description of the configuration and the control of the brake system is dispensed with.

The vehicle is provided with a CAN (car area network or controllable area network) 44 to which are connected the two steering ECUs 16, the operation ECU 18, the drive ECU 26, and the brake ECU 38. Those ECUs 16, 18, 26, 38 perform respective controls while communicating with one another via the CAN 44. In this respect, each of the ECUs 16, 18, 26, 38 includes: a computer including a CPU, a ROM, a RAM and so on; and drivers (drive circuits) for driving corresponding constituent components (such as an electric motor, a valve, and a pump) based on commands of the computer. The vehicle is provided with: a longitudinal acceleration sensor 46 for detecting longitudinal acceleration that is acceleration in the front-rear direction generated in the vehicle; and wheel speed sensors 48 provided for the respective two rear wheels 10R each for detecting a wheel rotational speed $v_W$ (hereinafter referred to as "wheel speed $v_W$" where appropriate) of the corresponding rear wheel 10R. The longitudinal acceleration sensor 46 and the wheel speed sensors 48 are also connected to the CAN 44.

[B] Hardware Configuration of Steering System

Figure 2:
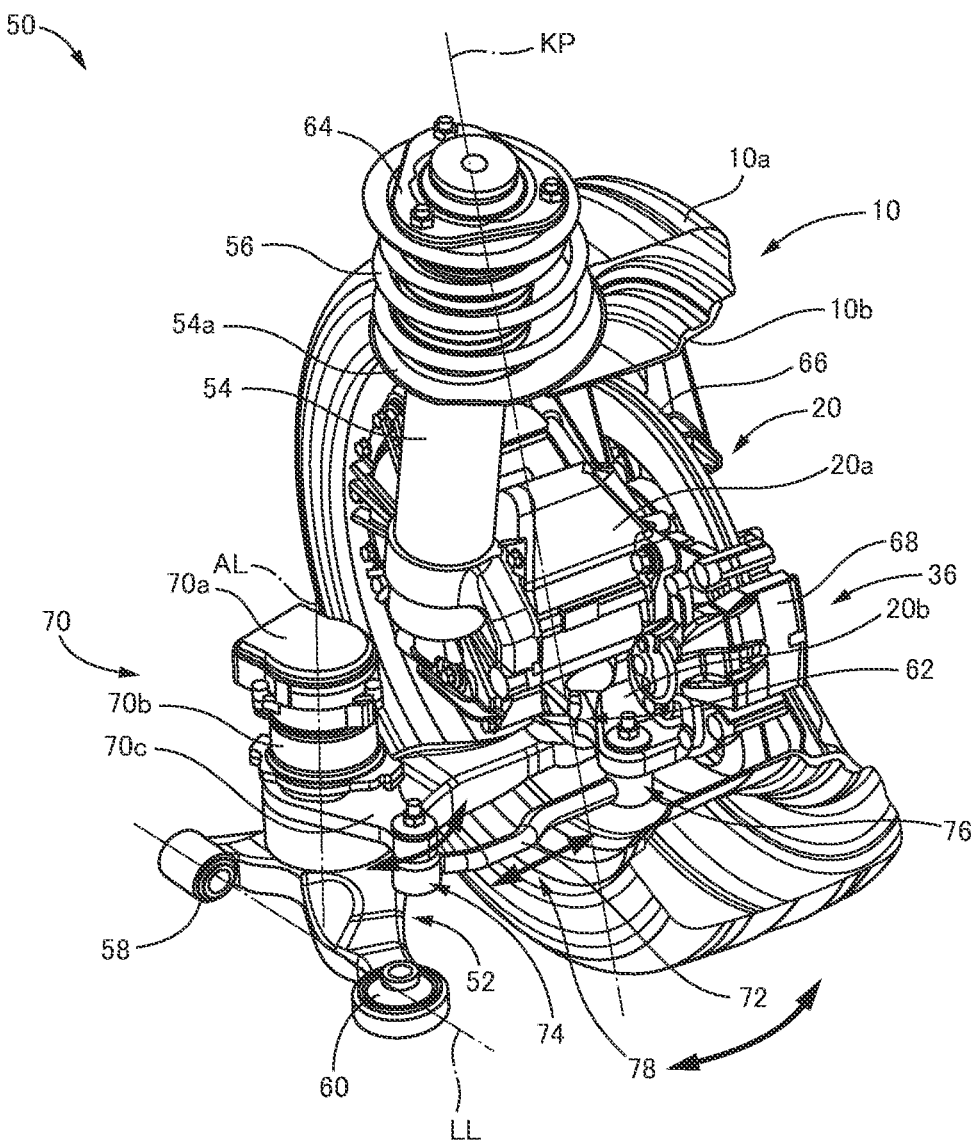
FIG. 2 is a perspective view of a wheel mounting module including a wheel steering device of the steering system according to the embodiment.

The two wheel steering devices 12 of the steering system according to the present embodiment are incorporated into respective two wheel mounting modules 50. Into each of the two wheel mounting modules 50, a corresponding one of the two wheel drive units 20 of the vehicle drive system and a corresponding one of the four brake device 36 are also incorporated. As illustrated in FIG. 2, the wheel mounting module 50 (hereinafter simply referred to as "module 50" where appropriate) is a module for mounting, on a body of the vehicle, a wheel 10b to which a tire 10a is mounted. Though the wheel 10b itself may be considered as the wheel, the wheel 10b to which the tire 10a is mounted is referred to as the wheel 10 in the present embodiment for convenience sake.

The configuration of the module 50 and the configuration of the wheel steering devices 12 of the present steering system will be described. The wheel drive unit 20 incorporated in the module 50 includes: a housing 20a; an electric motor (as one example of a drive source) and a speed reducer for reducing rotation of the electric motor (both the electric motor and the speed reducer are housed in the housing 20a and are not illustrated); and an axle hub to which the wheel 10b is attached. (The axle hub is hidden and invisible in FIG. 2.) The wheel drive unit 20 is disposed inside a rim of the wheel 10b and is what is called in-wheel motor unit. The wheel drive unit 20 has a well-known configuration, and description of which is dispensed with.

The module 50 includes a MacPherson-type suspension device (also referred to as "MacPherson strut type suspension device"). In the suspension device, the housing 20a of the wheel drive unit 20 functions as a carrier that rotatably holds the wheel. Further, the housing 20a functions as a steering knuckle in the wheel steering device 12 and is allowed to move upward and downward relative to the vehicle body. Thus, the suspension device includes a lower arm 52 (as one example of a suspension arm), the housing 20a of the wheel drive unit 20, a shock absorber 54, and a suspension spring 56.

The suspension device has an ordinary configuration and will be briefly described. The lower arm 52 is an L-shaped arm and has a base end portion divided into two portions in the front-rear direction of the vehicle. The lower arm 52 is supported, at the base end portion thereof, by a side member (not illustrated) of the vehicle body through a first bushing 58 and a second bushing 60 so as to be pivotable about an arm pivot axis LL. The housing 20a of the wheel drive unit 20 is pivotaly coupled, at the lower portion thereof, to the distal end portion of the lower arm 52 through an arm coupling ball joint 62. The arm coupling ball joint 62 is one example of a first joint and will be hereinafter referred to as "first joint 62" where appropriate.

The lower end portion of the shock absorber 54 is fixedly supported to the housing 20a of the wheel drive unit 20 while the upper end portion of the shock absorber 54 is supported by an upper portion of a tire housing of the vehicle body through an upper support 64. The upper end portion of the suspension spring 56 is also supported by the upper portion of the tire housing of the vehicle body through the upper support 64 while the lower end portion of the suspension spring 56 is supported by a lower support 54a in the form of a flange provided on the shock absorber 54. That is, the suspension spring 56 and the shock absorber 54 are disposed in parallel between the lower arm 52 and the vehicle body.

As described above, the module 50 includes the brake device 36. The brake device 36 is a disc brake device including: a disc rotor 66 attached to the axle hub together with the wheel 10b and configured to rotate with the wheel 10; and a brake caliper 68 held by the housing 20a of the wheel drive unit 20 such that the brake caliper 68 straddles the disc rotor 66. Though not explained in detail, the brake caliper 68 includes a hydraulic cylinder and brake pads each functioning as a friction member. The brake device 36 is configured to generate a braking force for stopping rotation of the wheel 10 by pressing the brake pads against the disc rotor 66 in dependence on the pressure of the working fluid supplied from the working-fluid supply device 34 to the hydraulic cylinder.

The wheel steering device 12 is a single-wheel independent steering device for steering only one of the right and left wheels 10 independently of the other. The wheel steering device 12 includes the housing 20a of the wheel drive unit 20 functioning as the steering knuckle, a steering actuator 70 disposed on the lower arm 52 at a position close to the base end portion of the lower arm 52, and a tie rod 72 coupling the steering actuator 70 and the steering knuckle 20a. The housing 20a of the wheel drive unit 20 will be hereinafter referred to as "steering knuckle 20a" when treated as a constituent element of the wheel steering device 12.

The steering actuator 70 includes: a steering motor 70a, which is an electric motor functioning as a drive source; a speed reducer 70b for decelerating rotation of the steering motor 70a; and an actuator arm 70c functioning as a pitman arm and configured to be pivoted by the rotation of the steering motor 70a decelerated by the speed reducer 70b. The base end portion of the tie rod 72 is connected to the actuator arm 70c through a rod-base-end coupling ball joint 74. The rod-base-end coupling ball joint 74 is one example of a second joint and will be hereinafter referred to as "second joint 74" where appropriate. The distal end portion of the tie rod 72 is coupled to a knuckle arm 20b of the steering knuckle 20a through a rod-distal-end coupling ball joint 76. The rod-distal-end coupling ball joint 76 is one example of a third joint and will be hereinafter referred to as "third joint 76" where appropriate.

In the wheel steering device 12, a line connecting the center of the upper support 64 and the center of the first joint 62 is a kingpin axis KP. By activating the steering motor 70a, the actuator arm 70c of the steering actuator 70 pivots about an actuator axis AL, as indicated by a bold arrow in FIG. 2, and the pivotal movement of the actuator arm 70c is transmitted to the steering knuckle 20a by the tie rod 72, so that the steering knuckle 20a is pivoted about the kingpin axis KP. That is, the wheel 10 is steered as indicated by a bold arrow in FIG. 2. In this configuration, the wheel steering device 12 includes a motion converting mechanism 78 constituted by the actuator arm 70c, the tie rod 72, the knuckle arm 20b, etc., for converting the rotational motion of the steering motor 70a into the steering motion of the wheel 10.

In the wheel steering device 12, the steering actuator 70 is disposed on the lower arm 52. Thus, mounting work of mounting the module 50 to the vehicle body can be easily performed. In other words, the suspension device, the brake device, and the wheel steering device can be easily mounted on the vehicle simply by attaching the base end portion of the lower arm 52 to the side member of the vehicle body and attaching the upper support 64 to the upper portion of the tire housing of the vehicle body. That is, the module 50 is excellent in mountability with respect to the vehicle.

The operation device 14 has an ordinary configuration known in steer-by-wire steering systems. As illustrated in FIG. 1, the operation device 14 includes: a steering wheel 80 (as one example of a steering operating member) operable by the driver; a steering sensor 82 for detecting a steering operation angle that is a rotation angle of the steering wheel 80 as an operation amount of the steering operating member from a position thereof in a straight traveling of the vehicle (neutral position); and a reaction force applying device 84 configured to apply an operation reaction force to the steering wheel 80. The reaction force applying device 84 includes: a reaction force motor 84a, which is an electric motor serving as a source of the reaction force; and a speed reducer 84b for transmitting the force of the reaction force motor 84a to the steering wheel 80.

[C] Control of Steering System i) Basic Steering Control

Steering control executed in the present steering system is for steering each of the two front wheels 10F at a steering angle $\psi$ corresponding to a steering request. Each steering ECU 16 executes the steering control. The steering angle $\psi$ is synonymous with what is called toe angle. Here, a position of each front wheel 10F at which the front wheel 10F should be located in a straight traveling state of the vehicle is defined as a straight-traveling-state position (neutral position) of the front wheel 10F, and the steering angle of the front wheel 10F at the straight-traveling-state position is defined as a reference steering angle. In this case, the steering angle $\psi$ described above is considered as a phase displacement amount from the reference steering angle, namely, a steering amount. Hereinafter, the steering control executed by each steering ECU 16, namely, basic steering control, will be described. In this respect, the two steering ECUs 16 execute the same steering control. Thus, there will be described processing in the steering control executed by one steering ECU 16.

Based on detection by the steering sensor 82, the operation ECU 18 obtains an operation angle of the steering wheel 80 as a degree of the steering request, namely, as a degree of the steering operation. In other words, the operation ECU 18 obtains a steering operation angle $\delta$ (hereinafter simply referred to as "operation angle $\delta$" where appropriate). The operation ECU 18 transmits, via the CAN 44, information on the detected operation angle $\delta$ to the steering ECU 16, which controls the wheel steering device 12. Here, a position of the steering wheel 80 for causing the vehicle to travel straight, i.e., a straight-traveling-state position (neutral position), is defined as a reference operation position. In this case, the operation angle $\delta$ of the steering wheel 80 is considered as a position change amount from the reference operation position, in other words, the operation angle $\delta$ is considered as a steering operation amount.

The steering ECU 16 determines a target steering angle $\psi^*$ according to a set steering gear ratio based on the received information on the operation angle $\delta$. The target steering angle $\psi^*$ is the steering angle $\psi$ of the wheel 10 to be attained. The wheel steering device 12 is not equipped with a steering angle sensor for directly detecting the steering angle $\psi$ of the wheel 10. The steering ECU 16 of the present steering system therefore executes the steering control based on a motion position of the steering motor 70a, namely, based on a motor rotation angle $\theta$, utilizing a specific relationship between the steering angle $\psi$ of the wheel 10 and the motion position of the steering motor 70a. To this end, the steering ECU 16 determines a target motor rotation angle $\theta^*$ based on the target steering angle $\psi^*$. The target motor rotation angle $\theta^*$ is the motor rotation angle $\theta$ to be attained. In this respect, the motor rotation angle $\theta$ is considered as a displacement angle from a reference motor rotation angle that is a reference motion position of the steering motor 70a in the straight traveling state of the vehicle.

The steering force generated by the steering actuator 70 and a steering torque $Tq_S$ generated by the steering motor 70a are in a specific relationship relative to each other. Specifically, the steering force and the steering torque $Tq_S$ are generally proportional to each other. Accordingly, the steering ECU 16 determines the steering torque $Tq_S$ to be generated by the steering motor 70a based on an actual motor rotation angle $\theta$ and the target motor rotation angle $\theta^*$. The steering motor 70a is a brushless DC motor and includes a motor rotation angle sensor (such as a Hall IC, a resolver or the like) for phase switching in electric current supply thereto. Based on the detection by the motor rotation angle sensor, the steering ECU 16 detects the actual motor rotation angle $\theta$.

The steering torque $Tq_S$ is determined as follows. The steering ECU 16 obtains a deviation of the motor rotation angle $\theta$ with respect to the target motor rotation angle $\theta^*$, i.e., a motor rotation angle deviation $\Delta\theta$. Based on the motor rotation angle deviation $\Delta\theta$ ($=\theta^*-\theta$), the steering ECU 16 determines the steering torque $Tq_S$ according to the following expression:

$$Tq_S = G_P \cdot \Delta\theta + G_D \cdot (d\Delta\theta/dt) + G_I^* \int \Delta\theta \, dt$$

The above expression is an expression according to a PID feedback control law based on the motor rotation angle deviation $\Delta\theta$. In the expression, the first term, the second term, and the third term are a proportional term, a derivative term, and an integral term, respectively, and "$G_P$", "$G_D$", and "$G_I$" are a proportional term gain, a derivative term gain, and an integral term gain, respectively.

The steering torque $Tq_S$ and a supply current to the steering motor 70a, i.e., a steering current $I_S$, are in a specific relationship relative to each other. Specifically, the steering torque $Tq_S$ and the steering current $I_S$ are generally proportional relative to each other since the steering torque $Tq_S$ depends on the force generated by the steering motor 70a. Accordingly, the steering ECU 16 determines the supply current to the steering motor 70a, i.e., the steering current $I_S$, based on the determined steering torque $Tq_S$ and supplies the steering current $I_S$ to the steering motor 70a.

ii) Reaction Force Control

The reaction force control is for applying, to the steering wheel 80, a reaction force against the steering operation by the driver, i.e., an operation reaction force. The operation ECU 18 executes the reaction force control. The reaction force control is a known control, and the operation reaction force can be determined according to various techniques. In the present steering system, the operation ECU 18 determines a reaction force torque $Tq_C$ (as one sort of the operation reaction force) to be generated by the reaction force motor 84a of the reaction force applying device 84, according to a typical technique, namely, according to the following expression:

$$Tq_C = G\delta \cdot \delta + G_v \cdot v$$

In the above expression, "$G\delta$" and "$G_v$" are weighting gains respectively relating to the operation angle $\delta$ and a vehicle traveling speed v (hereinafter referred to as "vehicle speed v" where appropriate). That is, the reaction-force torque $Tq_C$ to be applied is increased with an increase in the steering operation amount and with an increase in the vehicle speed v. In this respect, the operation ECU 18 identifies the vehicle speed v based on the wheel speeds $v_W$ detected via the respective wheel speed sensors 48.

The operation ECU 18 determines a supply current to the reaction force motor 84a, i.e., a reaction force current $I_C$, based on the reaction force torque $Tq_C$ determined as described above and supplies the determined reaction force current $I_C$ to the reaction force motor 84a. The operation ECU 18 has a drive circuit (driver) for the reaction force motor 84a. The electric current $I_C$ is supplied to the reaction force motor 84a via the drive circuit.

The basic steering control described above is a control executed in manual driving in which the driver operates the steering wheel 80. In a case where the vehicle is capable of performing automated driving and automated driving is actually being performed, the steering control may be executed based on information on the target steering angle $\psi^*$ transmitted from an automated driving controller, for instance, instead of determining the target steering angle $\psi^*$ based on the operation angle $\delta$ transmitted from the operation ECU 18.

iii) Influences of External Force

Figure 3B:
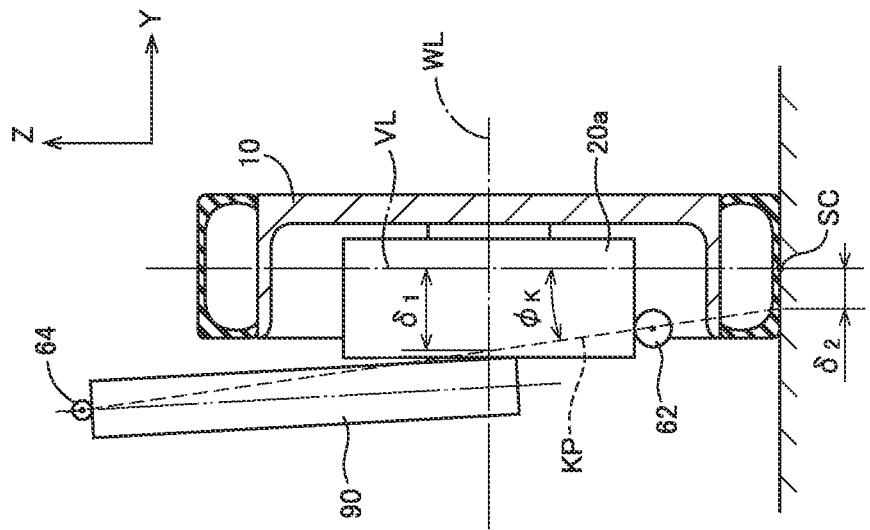
FIG. 3B is a schematic view for explaining the suspension geometry of the wheel mounting module illustrated in FIG. 2.
Figure 3A:
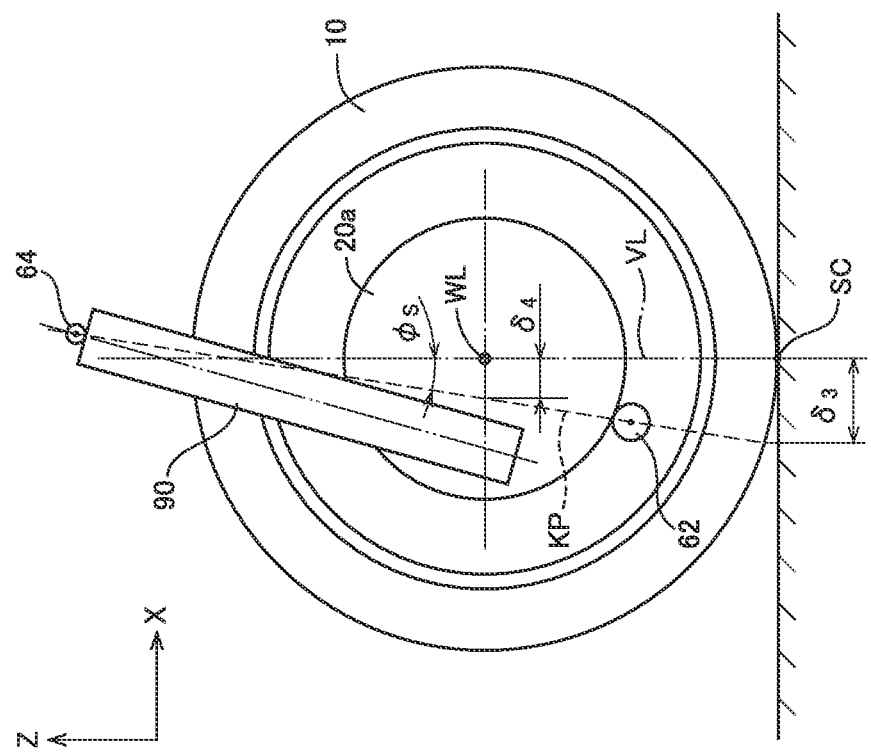
FIG. 3A is a schematic view for explaining suspension geometry of the wheel mounting module illustrated in FIG. 2.

The module 50 includes an ordinary strut-type suspension device, and the suspension geometry of the module 50 will be described referring to the schematic views of FIGS. 3A and 3B. Here, the rotation axis of the wheel 10 is defined as a wheel axis WL, and a line passing the center SC of a ground contact area of the wheel 10 and perpendicular to the ground contact area is defined as a vertical line VL. As apparent from FIG. 3A viewed in a wheel axis direction in which the wheel axis WL extends and FIG. 3B viewed in the front-rear direction, the vertical line VL intersects the wheel axis WL at right angles, in other words, the wheel axis WL is parallel to the road surface. In the following description, the wheel axis direction in which the wheel axis WL extends is referred to as a Y direction, the up-down direction is referred to as a Z direction, and a direction orthogonal to the wheel axis direction and horizontal is referred to as an X direction, as illustrated in FIGS. 3A and 3B. In a state in which the wheel 10 is not steered, the X direction coincides with the front-rear direction of the vehicle.

In FIGS. 3A and 3B, the shock absorber 54 and the suspension spring 56 are illustrated as one unit and represented as a spring/absorber assembly (Assy) 90. As described above, the line connecting the center of the first joint 62 and the center of the upper support 64 (i.e., the supporting center of the spring/absorber Assy 90 with respect to the vehicle body) is the kingpin axis KP. Here, a plane normal to the wheel axis WL is defined as "XZ plane", and a plane parallel to the wheel axis WL and normal to the road surface is defined as "YZ plane". An angle on the XZ plane formed by the kingpin axis KP and the vertical line VL when the kingpin axis KP and the vertical line VL are projected on the XZ plane is a caster angle $\varphi_S$. An angle on the YZ plane formed by the kingpin axis KP and the vertical line VL when the kingpin axis KP and the vertical line VL are projected on the YZ plane is a kingpin angle $\varphi_K$.

As illustrated in FIG. 3B, a horizontal distance on the YZ plane between: a point of intersection of the wheel axis WL and the vertical line VL; and the kingpin axis KP is a spindle offset $\delta_1$. A distance in the wheel axis direction between: a point of intersection of the kingpin axis KP and the ground contacting area; and the center SC of the ground contacting area is a kingpin offset $\delta_2$. As illustrated in FIG. 3A, a distance on the XZ plane between: the center SC of the ground contacting area; and the point of intersection of the kingpin axis KP and the ground contacting area is a caster trail $\delta_3$. A horizontal distance between the wheel axis WL and the kingpin axis KP is a caster offset $\delta_4$. Though not illustrated in FIGS. 3A and 3B, the ground contact area actually has a certain size, and the kingpin axis KP passes the ground contacting area.

A case is considered in which a force $F_X$ in the front-rear direction of the vehicle (i.e., a longitudinal force $F_X$), a force $F_Y$ in the vehicle width direction (i.e., a lateral force $F_Y$), or a force $F_Z$ in the up-down direction (i.e., an up-down force $F_Z$) acts on the wheel 10 from the outside, namely, from the road surface, as an external force. In a strict sense, the force $F_X$, the force $F_Y$, or the force $F_Z$ acts on the wheel 10 at the center SC of the ground contacting area. The wheel 10 is steered by the action of the longitudinal force $F_X$, the lateral force $F_Y$, or the up-down force $F_Z$. In other words, the steering knuckle 20a is rotated about the kingpin axis KP. Here, moments applied to the steering knuckle 20a due to the longitudinal force $F_X$, the lateral force $F_Y$, and the up-down force $F_Z$ are respectively referred to as a longitudinal-force-dependent moment $M_x$, a lateral-force-dependent moment $M_y$, and an up-down-force-dependent moment $M_z$. The longitudinal-force-dependent moment $M_x$, the lateral-force-dependent moment $M_y$, and the up-down-force-dependent moment $M_z$ are respectively represented by expressions of FIG. 4. In this respect, "A", "B", and "C" in the respective expressions are coefficients determined by the caster angle $\varphi_S$ and the kingpin angle $\varphi_K$.

When the up-down force $F_Z$ that arises from undulations of the road surface acts on the wheel 10, for instance, the wheel 10 is steered by the action of the up-down force $F_Z$. In this case, the actual steering angle $\psi$ in the steering control changes, and the electric current $I_S$ is supplied to the steering motor 70a such that the steering angle $\psi$ becomes equal to the target steering angle $\psi^*$. Similarly, when the longitudinal force $F_X$ that arises from application of the drive force or the braking force to the vehicle acts on the wheel 10 or when the lateral force $F_Y$ that arises from a crosswind acts on the wheel 10, the wheel 10 is steered by the action of the force. To cancel such steering, the electric current $I_S$ is supplied to the steering motor 70a.

In a steering system that includes a both-wheel steering device in which the right and left steering knuckles are mechanically coupled by a steering rod or the like, the steering direction of the right wheel 10 and the steering direction of the left wheel 10 that arise from the longitudinal force $F_X$ are mutually opposite in the right-left direction, and the longitudinal-force-dependent moments $M_x$ generated for the right and left wheels 10 are offset. Accordingly, in the both-wheel steering device, the action of the longitudinal force $F_X$ is not problematic in terms of energy consumption and the vehicle steering stability. Though the steering directions of the right and left wheels 10 that arise from the up-down force $F_Z$ are not necessarily always mutually opposite, the up-down-force-dependent moments $M_z$ generated for the right and left wheels 10 are somewhat offset in the both-wheel steering device. In other words, the energy consumption and the reduction in the vehicle steering stability due to steering of the wheels 10 arising from the longitudinal force $F_X$ or the up-down force $F_Z$ are problematic and serious because the present steering system is the right-left independent steering system. The action of the lateral force $F_Y$ generates the lateral-force-dependent moments $M_y$ for the right and left wheels 10 that act on the same direction. Accordingly, the lateral-force-dependent moments $M_y$ generated for the right and left wheels 10 cannot be offset even in the both-wheel steering device. In a case where the vehicle turns with the wheels 10 steered by the respective steering actuators 70, however, it is a matter of course that the lateral-force-dependent moments $M_y$ are generated. Thus, it is not necessary in such a case to consider that the generation of the lateral-force-dependent moments $M_y$ is due to the influence by the external force.

iv) Addressing Change in Steering Angle Due to External Force

In the present steering system, the change in the steering angle $\psi$ of the wheel 10 that arises from the longitudinal force $F_X$ (as one example of the external force) is regarded as a factor that adversely influences the vehicle steering stability, and the steering-amount stabilizing control is executed to prevent or reduce the change. Specifically, the adverse influence of the external force on the vehicle steering stability is more likely to be recognized when the vehicle is traveling straight. Thus, in a case where the actual steering angle $\psi$ identified based on the actual motor rotation angle $\theta$ is not greater than a threshold steering angle $\psi_{TH}$, at which the vehicle is regarded as traveling straight, the steering ECU 16 recognizes a situation in which a braking force $F_B$ applied to the vehicle as a whole is not less than a set threshold braking force $F_{BTH}$ or a situation in which a drive force $F_D$ applied to the vehicle is not less than a set threshold drive force $F_{DTH}$, as an external-force-dependent steering situation in which the wheel 10 is steered or likely to be steered by the external force. The steering ECU 16 executes the steering-amount stabilizing control in the external-force-dependent steering situation. In this respect, the braking force $F_B$ is obtained based on information sent from the brake ECU 38 via the CAN 44, and the drive force $F_D$ is obtained based on information sent from the drive ECU 26 via the CAN 44.

In the steering-amount stabilizing control, the steering ECU 16 increases the value of the derivative term gain $G_D$ in the above expression used for determining the steering torque $Tq_S$, so as to prevent or reduce a change in the steering angle $\psi$. The derivative term in the expression is a term relating to a change in the motor rotation angle $\theta$ with respect to the target motor rotation angle $\theta^*$, namely, a term relating to a change in the steering angle $\psi$ with respect to the target steering angle $\psi^*$. The increase in the derivative term gain $G_D$ leads to an enhanced effect of preventing or reducing the change in the steering angle $\psi$, namely, the increase in the derivative term gain $G_D$ leads to high response to the change in the steering angle $\psi$. In other words, the steering-amount stabilizing control is configured to make the steering position of the wheel 10 less likely to be changed from the position corresponding to the steering amount based on the steering request. Specifically, the steering ECU 16 changes the derivative term gain $G_D$ set at $G_{D1}$ in the basic steering control to $G_{D2}$ ($>G_{D1}$) in the steering-amount stabilizing control.

v) Flow of Processing in Steering Control

Figure 5:
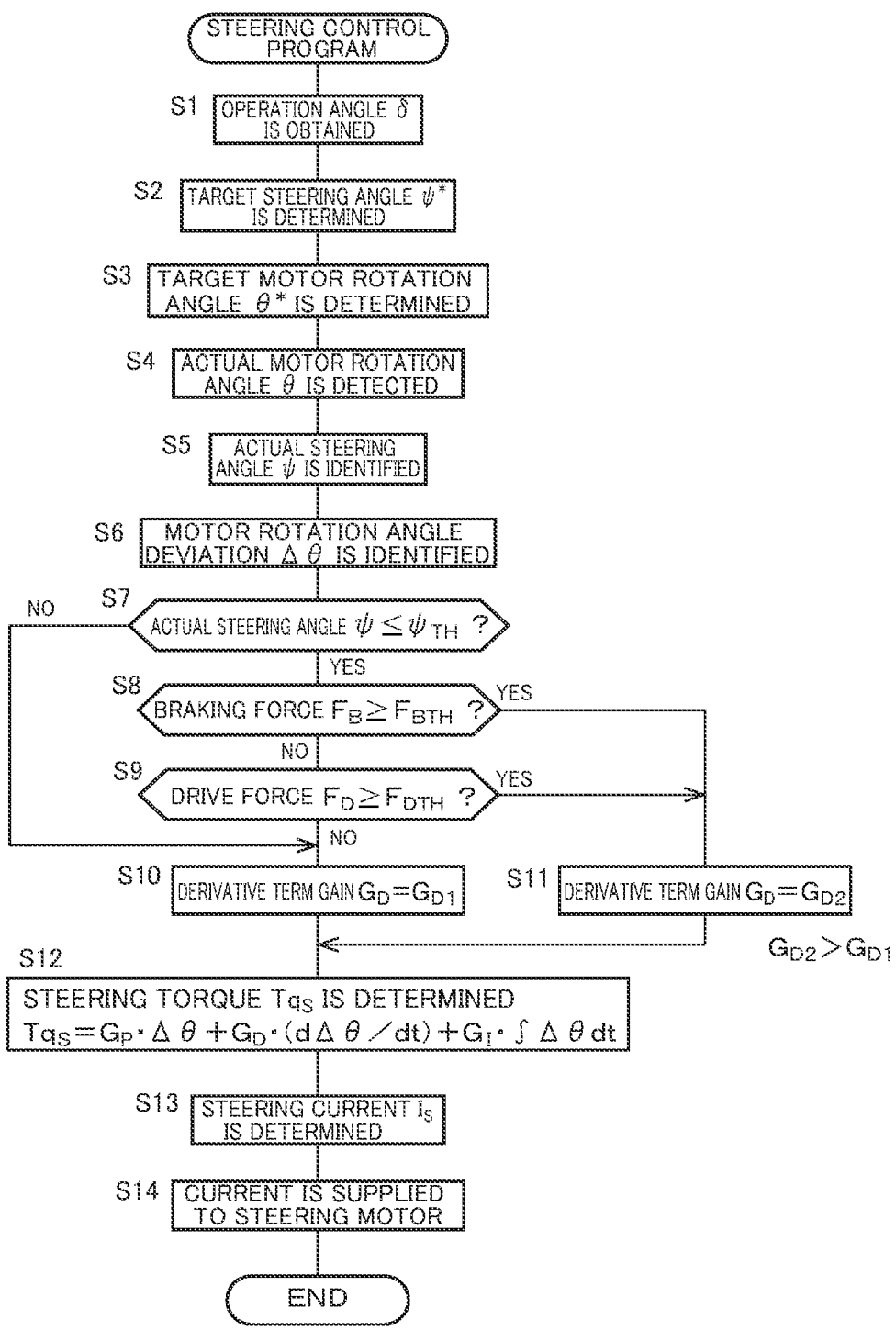
FIG. 5 is a flowchart of a steering control program executed in the steering system according to the embodiment.

The computer of each steering ECU 16 repeatedly executes a steering control program represented by a flowchart of FIG. 5 at a short time pitch, e.g., from several to several tens of milliseconds, so that the steering control including the steering-amount stabilizing control is executed. Referring to the flowchart, there will be hereinafter briefly described the flow of processing in the steering control.

In the processing according to the steering control program, at Step 1, the operation angle $\delta$ of the steering wheel 80 detected by the operation ECU 18 is obtained via the CAN 44. (Hereinafter, Step 1 is abbreviated as "S1". Other steps are similarly abbreviated.) At S2, the target steering angle $\psi^*$ of the wheel 10 is determined based on the operation angle $\delta$. At S3, the target motor rotation angle $\theta^*$ is determined based on the target steering angle $\psi^*$. At S4, the actual motor rotation angle $\theta$ is detected. At S5, the actual steering angle $\psi$ is identified based on the detected actual motor rotation angle $\theta$. At S6, the motor rotation angle deviation $\Delta\theta$ is identified.

It is determined at S7 whether the actual steering angle $\psi$ is not greater than the threshold steering angle km, namely, whether the vehicle is traveling straight. When the vehicle is traveling straight, S8 and S9 are implemented to determine whether the braking force $F_B$ being applied to the vehicle is not less than the threshold braking force $F_{BTH}$ or to determine whether the drive force $F_D$ being applied to the vehicle is not less than the threshold drive force $F_{DTH}$.

When the vehicle is not traveling straight and when neither the braking force $F_B$ not less than the threshold braking force $F_{BTH}$ nor the drive force $F_D$ not less than the threshold drive force $F_{DTH}$ is being applied to the vehicle even though the vehicle is traveling straight, the control flow proceeds to S10 at which the derivative term gain $G_D$ is set to $G_{D1}$. When the vehicle is traveling straight and the braking force $F_B$ not less than the threshold braking force $F_{BTH}$ or the drive force $F_D$ not less than the threshold drive force $F_{DTH}$ is being applied, the control flow proceeds to S11 at which the derivative term gain $G_D$ is set to $G_{D2}$ greater than $G_{D1}$.

After the derivative term gain $G_D$ is set, the steering torque $Tq_S$ is determined at S12 according to the above expression based on the PID feedback control law. At S13, the steering current $I_S$ is determined based on the determined steering torque $Tq_S$. At S14, the current based on the determined steering current $I_S$ is supplied to the steering motor 70a. Thus, one execution of the program is ended.

What is claimed is:

1. A steer-by-wire steering system, comprising:
a pair of wheel steering devices respectively provided for right and left wheels of a vehicle, each of the pair of wheel steering devices including an actuator and configured to steer a corresponding one of the right and left wheels independently of the other of the right and left wheels; and
a controller configured to control the pair of wheel steering devices such that steering amounts of the respective right and left wheels are equal to respective amounts based on a steering request,
wherein the controller executes a steering-amount stabilizing control to reduce a change in the steering amounts in an external-force-dependent steering situation in which the right and left wheels are steered or likely to be steered by an external force that acts on the right and left wheels, wherein the controller executes a control in which the controller determines, based on the steering request, target steering amounts each as a target for the steering amount of a corresponding one of the right and left wheels and determines, according to a PID feedback control technique, steering forces to be generated by the respective actuators of the pair of wheel steering devices, based on steering amount deviations each of which is a deviation of an actual steering amount with respect to the target steering amount determined for a corresponding one of the right and left wheels, and wherein the controller executes, as the steering-amount stabilizing control, a control for increasing a derivative term gain in the PID feedback control technique.

2. The steer-by-wire steering system according to claim 1, wherein the controller identifies that the vehicle is in the external-force-dependent steering situation when a braking force or a drive force each having a magnitude not less than a set magnitude is applied to the vehicle.

3. The steer-by-wire steering system according to claim 1, wherein the controller executes the steering-amount stabilizing control on condition that the vehicle is traveling straight.

4. The steer-by-wire steering system according to claim 1, wherein the controller executes, as the steering-amount stabilizing control, a control for making steering positions of the respective right and left wheels less likely to be changed from respective positions of the right and left wheels corresponding to the respective amounts based on the steering request.

* * * * *